(12) United States Patent
Sato et al.

(10) Patent No.: US 10,768,511 B1
(45) Date of Patent: Sep. 8, 2020

(54) IMAGING DEVICE

(71) Applicant: Panasonic Intellectual Property Management Co., Ltd., Osaka (JP)

(72) Inventors: Tatsuya Sato, Osaka (JP); Hikaru Tsuchitani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/537,592

(22) Filed: Aug. 11, 2019

(30) Foreign Application Priority Data

Apr. 11, 2019 (JP) .................................. 2019-075563

(51) Int. Cl.
*G03B 17/56* (2006.01)
*H04N 5/225* (2006.01)

(52) U.S. Cl.
CPC ......... *G03B 17/563* (2013.01); *G03B 17/566* (2013.01); *H04N 5/2251* (2013.01)

(58) Field of Classification Search
CPC .. G03B 17/563; G03B 17/566; G03B 17/561; G03B 17/56; G03B 17/14; H04N 5/2251
See application file for complete search history.

(56) References Cited

U.S. PATENT DOCUMENTS

| 2015/0131985 A1* | 5/2015 | Shodai | G03B 11/045 396/448 |
| 2015/0219982 A1* | 8/2015 | Aiello | H01R 13/639 361/601 |
| 2016/0062217 A1* | 3/2016 | Slater | G03B 17/566 348/375 |
| 2018/0164663 A1* | 6/2018 | Ishida | H04N 5/2252 |
| 2018/0275493 A1* | 9/2018 | Hirota | H04N 5/2254 |
| 2018/0356711 A1* | 12/2018 | Otsuka | G03B 17/566 |
| 2019/0181509 A1* | 6/2019 | Ohtsuka | H01M 10/425 |

FOREIGN PATENT DOCUMENTS

| JP | 2005-184504 A | | 7/2005 |
| JP | 2005184504 A | * | 7/2005 |
| JP | 2015-111240 A | | 6/2015 |
| JP | 2018-163326 A | | 10/2018 |

* cited by examiner

*Primary Examiner* — Amy R Hsu
(74) *Attorney, Agent, or Firm* — Renner, Otto, Boisselle & Sklar, LLP

(57) ABSTRACT

An imaging device of the present disclosure is configured that when the accessory holding unit is mounted to the imaging device main-body, the first mounting/removing movable portion and the second mounting/removing movable portion are moved to the mounted positions, the first engaging portion and the first engaged portion are engaged with each other, the second engaged portion and the second engaging portion are engaged with each other, the locking portion and the locked portion are locked to each other, and the first connection terminal and the second connection terminal are electrically connected to each other, and when an accessory component is mounted only to the first engaged portion, the first mounting/removing movable portion is moved to the mounted position, and the second mounting/removing movable portion is held at the non-mounted position to protect the second engaged portion, the locked portion, and the first connection terminal.

5 Claims, 14 Drawing Sheets

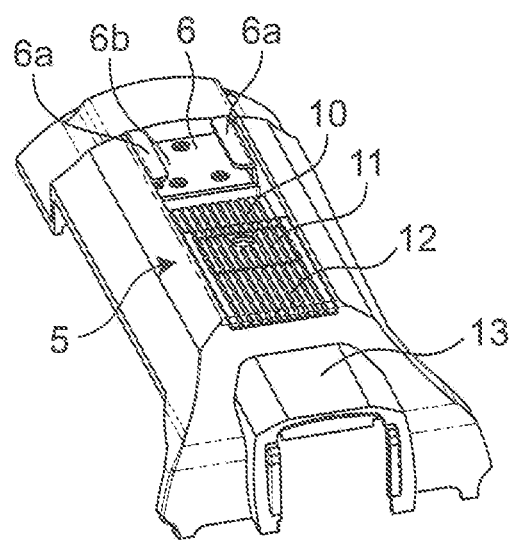 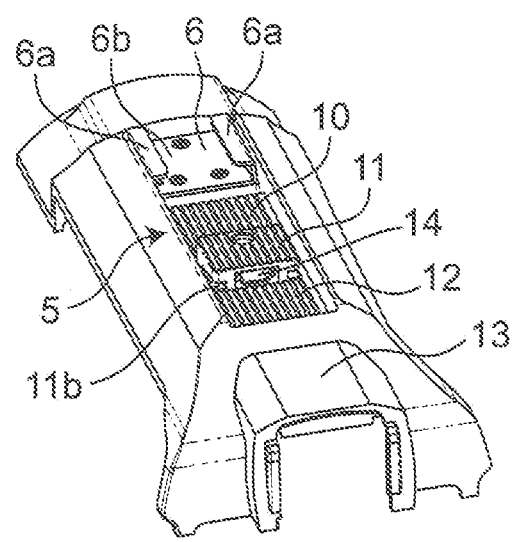

IMAGING DEVICE

TECHNICAL FIELD

The present disclosure relates to an imaging device, and more particularly to an imaging device including a mounting and removing (mounting/removing) mechanism for mounting/removing accessory components having various functions to and from a main body of the imaging device.

BACKGROUND ART

In an imaging device such as a video camera, various accessory components (lights, microphones, and the like) are mechanically and electrically mountable and removable. In addition, as the video camera, there is given a configuration provided with a grip that can be held with one hand in order that a camera operator performs shooting while holding it with hand. In such a configuration provided with a grip, a configuration in which a grip is mountable and removable is also proposed (see PLT1).

Furthermore, in imaging devices, video cameras for business use with high performance and high image quality have been developed. Among such video cameras for business use, for example, there is one used as a so-called director's camera in order that a director itself goes to a site for shooting so as to produce an image product with a low budget. Since such video cameras for business use are heavy objects that are difficult to hold with one hand, a support such as a tripod is used for shooting at a fixed point, but a camera operator is required to perform shooting while supporting the video camera during moving shooting. In such a video camera for business use, which is a heavy object, a large handle is provided at the top of the video camera so that a camera operator can stably support the video camera (see PLT2 and PLT3).

CITATION LIST

Patent Literatures

PLT1: JP 2005-184504 A
PLT2: JP 2015-111240 A
PLT3: JP 2018-163326 A

SUMMARY OF INVENTION

Technical Problem

As described above, in particular, in an imaging device such as a video camera for business use, which is a heavy object, a handle is provided so that a camera operator can stably and securely hold it. As such a handle, there are given a configuration formed integrally with an outer shell of an imaging device, and a configuration that is fixed to an outer shell of an imaging device by a plurality of screws and can be removed therefrom (see PLT2 and PLT3).

In the imaging device, a configuration convenient to carry is desired, and in particular, in a video camera for business use, which is used as a director's camera for moving shooting, a configuration that can be downsized at the time of housing is advantageous in being convenient to carry. In video cameras for business use, as with various accessories, the fact that a handle provided on the outer shell of the camera in a protruding manner is mountable and removable allows downsizing when the video camera is housed, thereby attaining a configuration convenient to carry.

However, for example, in the case of the configuration where the handle is fixed to the main body using a plurality of screws as described in PLT3, mounting and removal of the handle is not easy, and for a camera operator, it is not a configuration of enabling downsizing easily at the time of housing.

Further, among the components that are mounted to and removed from the main body of the imaging device, there are components that are mounted to and removed from the main body only mechanically or components that are mounted to and removed from (brought into contact with and separated away from) the main body mechanically and electrically. There is a need for an imaging device including a mounting/removing mechanism that allows easy and appropriate mounting and removing of such various components by the same mounting and removing operation.

The present disclosure has been made to solve the problems described above, and provides a highly-safety and highly-reliable imaging device which facilitates mounting and removing of a component to and from the imaging device and allows appropriate mounting and removing in accordance with a component to be mounted and removed.

Solution to Problem

According to one aspect of the present disclosure, there is provided an imaging device, including:

an imaging device main-body; and an accessory holding unit easily mountable to and removable from the imaging device main-body, wherein the imaging device main-body includes a main-body side mounting/removing portion for mounting and removing the accessory holding unit, the main-body side mounting/removing portion includes a first engaged portion, a second engaged portion, a locked portion, and a first connection terminal having an electrical contact, the accessory holding unit includes a first engaging portion, a second engaging portion, a locking portion, and a second connection terminal, the main-body side mounting/removing portion includes a first mounting/removing movable portion which is disposed adjacent to the first engaged portion and is movable between a non-mounted position and a mounted position, and a second mounting/removing movable portion which is disposed adjacent to the second engaged portion, the locked portion, and the first connection terminal and is movable between a non-mounted position and a mounted position, when the accessory holding unit is mounted to the imaging device main-body, by pressing by the accessory holding unit, the first mounting/removing movable portion and the second mounting/removing movable portion are moved to the mounted positions, and the first engaging portion and the first engaged portion are engaged with each other, the second engaged portion and the second engaging portion are engaged with each other, the locking portion and the locked portion are locked to each other, and the first connection terminal and the second connection terminal are electrically connected to each other, and when an accessory component is mounted only to the first engaged portion of the main-body side mounting/removing portion, by pressing by the accessory component, the first mounting/removing movable portion is moved to the mounted position to secure a mounting space for a mounting operation of the accessory component, and the second mounting/removing movable portion is held at the non-mounted position to protect the second engaged portion, the locked portion, and the first connection terminal.

Advantageous Effects of Invention

According to the present disclosure, it is possible to provide a highly-reliable imaging device which facilitates mounting and removing of a component to and from the imaging device and allows appropriate mounting and removing in accordance with a component to be mounted and removed.

BRIEF DESCRIPTION OF DRAWINGS

FIGS. 5A and 5B are perspective views for illustrating the operations of the main-body side mounting/removing portion of the main-body side top cover in the video camera of the first embodiment;

DESCRIPTION OF EMBODIMENTS

Figure 1:
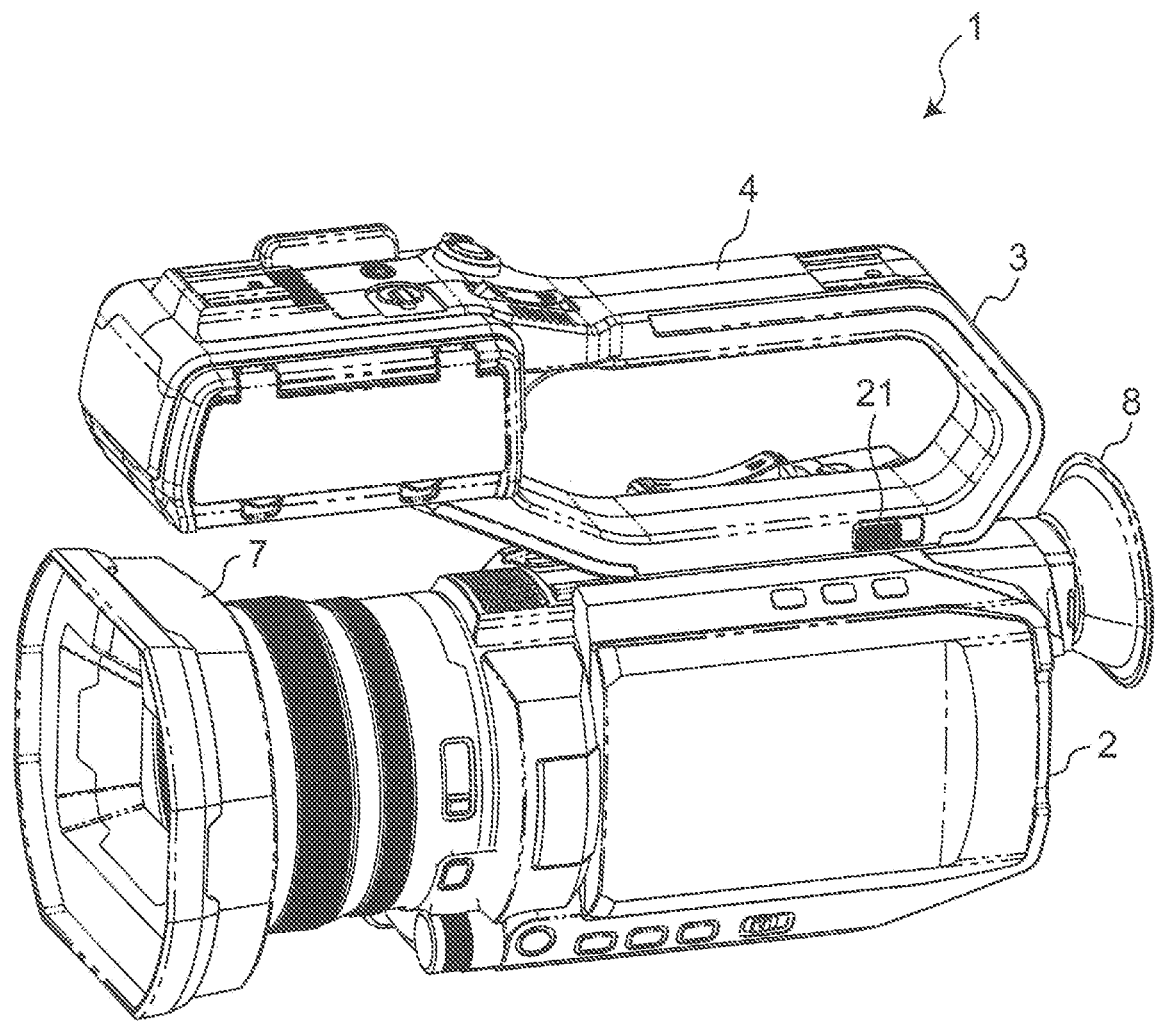
FIG. 1 is a perspective view for illustrating the entirety of a video camera according to a first embodiment of the present disclosure.

Hereinafter, a video camera is described with reference to the accompanying drawings as a specific embodiment of an imaging device of the present disclosure. In addition, the imaging device of the present disclosure is not limited to the structure of the video camera described in the following embodiment, and includes a configuration of an imaging device based on the technical thought equivalent to the technical feature described in the following embodiment.

In addition, numerical values, shapes, configurations, steps (processes, modes), the order of steps, and the like described in the following embodiment are merely examples, and the present invention is not limited to the contents of the present disclosure. Among the components in the following embodiment, components that are not described in the independent claim indicating the highest-level concept are described as optional components.

First, various aspects of the imaging device of the present disclosure are exemplified.

According to a first aspect of the present disclosure, there is provided an imaging device, including:

an imaging device main-body; and an accessory holding unit mountable to and removable from the imaging device main-body, wherein the imaging device main-body includes a main-body side mounting/removing portion for mounting and removing the accessory holding unit, the main-body side mounting/removing portion includes a first engaged portion, a second engaged portion, a locked portion, and a first connection terminal having an electrical contact, the accessory holding unit includes a first engaging portion, a second engaging portion, a locking portion, and a second connection terminal, the main-body side mounting/removing portion includes a first mounting/removing movable portion which is disposed adjacent to the first engaged portion and is movable between a non-mounted position and a mounted position, and a second mounting/removing movable portion which is disposed adjacent to the second engaged portion, the locked portion, and the first connection terminal and is movable between a non-mounted position and a mounted position, when the accessory holding unit is mounted to the imaging device main-body, by pressing by the accessory holding unit, the first mounting/removing movable portion and the second mounting/removing movable portion are moved to the mounted positions, and the first engaging portion and the first engaged portion are engaged with each other, the second engaged portion and the second engaging portion are engaged with each other, the locking portion and the locked portion are locked to each other, and the first connection terminal and the second connection terminal are electrically connected to each other, and when an accessory component is mounted only to the first engaged portion of the main-body side mounting/removing portion, by pressing by the accessory component, the first mounting/removing movable portion is moved to the mounted position to secure a mounting space for a mounting operation of the accessory component, and the second mounting/removing movable portion is held at the non-mounted position to protect the second engaged portion, the locked portion, and the first connection terminal.

In a second aspect of the imaging device of the present disclosure, when the second mounting/removing movable portion in the first aspect is pressed by the accessory holding unit and is moved to the mounted position, the first mounting/removing movable portion is moved to the mounted position in conjunction therewith, and, when the first mounting/removing movable portion is pressed by the accessory component and is moved to the mounted position, the second mounting/removing movable portion is held at the non-mounted position.

In a third aspect of the imaging device of the present disclosure, when the accessory holding unit in the first or second aspect is mounted to the imaging device main-body, by pressing by the accessory holding unit, the first mounting/removing movable portion and the second mounting/removing movable portion may be moved to the mounted positions, and by a sliding operation after the pressing operation, the first engaging portion and the first engaged portion may be engaged with each other, the second engaged portion and the second engaging portion may be engaged with each other, the locking portion and the locked portion may be locked to each other, and the first connection terminal and the second connection terminal may be electrically connected to each other.

In a fourth aspect of the imaging device of the present disclosure, in the first mounting/removing movable portion and the second mounting/removing movable portion at the non-mounted positions in any of the first to third aspects, surfaces to which the accessory holding unit is mounted may be substantially flush.

In a fifth aspect of the imaging device of the present disclosure, in any of the first to fourth aspects, a plurality of grooves extending in a sliding direction of the sliding operation of the accessory holding unit may be formed in a surface of the main-body side mounting/removing portion to which the accessory holding unit is mounted.

First Embodiment

Figure 2:
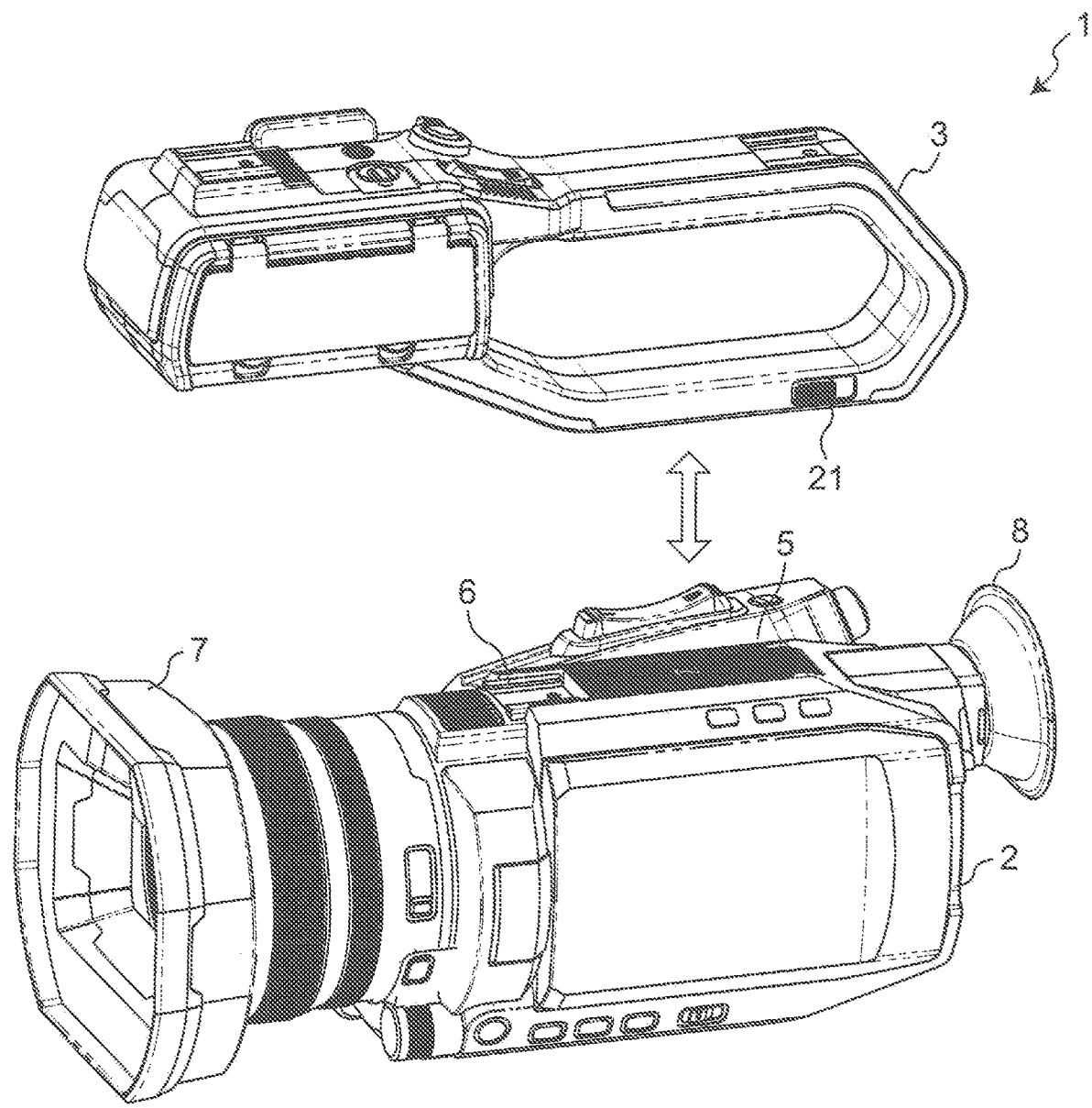
FIG. 2 is a perspective view for illustrating a state where an accessory holding unit is removed from a video camera main-body (imaging device main-body) in the video camera according to the first embodiment.

Hereinafter, a video camera for business use as an imaging device according to a first embodiment of the present disclosure is described with reference to the drawings. FIG. 1 is a perspective view for illustrating the entirety of a video camera 1 for business use of the first embodiment. FIG. 2 is a perspective view for illustrating a state where an accessory holding unit 3 including a handle 4 is removed from a video camera main-body (imaging device main-body) 2 in the video camera 1. The accessory holding unit 3 illustrated in FIG. 2 is provided with a microphone, a light, and a mounting/removing mechanism such as a shoe structure for mounting various accessories on the front side as a subject side, and the handle 4 that can be held with a hand, various operating buttons, and the like are provided on the rear side. In the present disclosure, in the front-rear direction in the imaging device of the first embodiment, the subject side that a lens hood 7 of the video camera main-body 2 faces is defined as the front, and a camera operator side on which a camera operator looks into an eyecup 8 is defined as the rear. Further, the upper and lower sides in the imaging device of the first embodiment indicate the upper and lower positions in the video camera being the imaging device illustrated in FIGS. 1 and 2.

As illustrated in FIGS. 1 and 2, the video camera 1 of the first embodiment is configured such that the accessory holding unit 3 is removed from the video camera main-body 2, and can easily achieve downsizing at the time of housing. The video camera main-body 2 is configured to be able to perform normal shooting even when the accessory holding unit 3 is removed, and is provided with various operation switches and various functions used for normal shooting. In the configuration of the first embodiment, the accessory holding unit 3 includes a component having the function of a handle configured to be able to support the video camera main-body 2 being the imaging device main-body, or may have a configuration of only the function of the handle.

The video camera main-body 2 includes a lens unit being an optical device similar to a general video camera, and an imaging unit, which converts light incident on the lens unit into an electrical signal and picks up an image. At an upper portion of the video camera main-body 2, a main-body side mounting/removing portion 5 is provided at a position where the accessory holding unit 3 including the handle 4 is mounted. A main-body side shoe 6 being a first engaged portion, which is a shoe structure for mounting an accessory component such as a light, is provided on the front side of the main-body side mounting/removing portion 5. As illustrated in FIG. 2, in the upper part of the video camera main-body 2, the main-body side mounting/removing portion 5 and the main-body side shoe 6 are disposed in line in the front and rear direction. Further, the main-body side mounting/removing portion 5 and the main-body side shoe 6 are disposed centering on a position at which the right and left balance of the video camera main-body 2 is equal.

Figure 3:
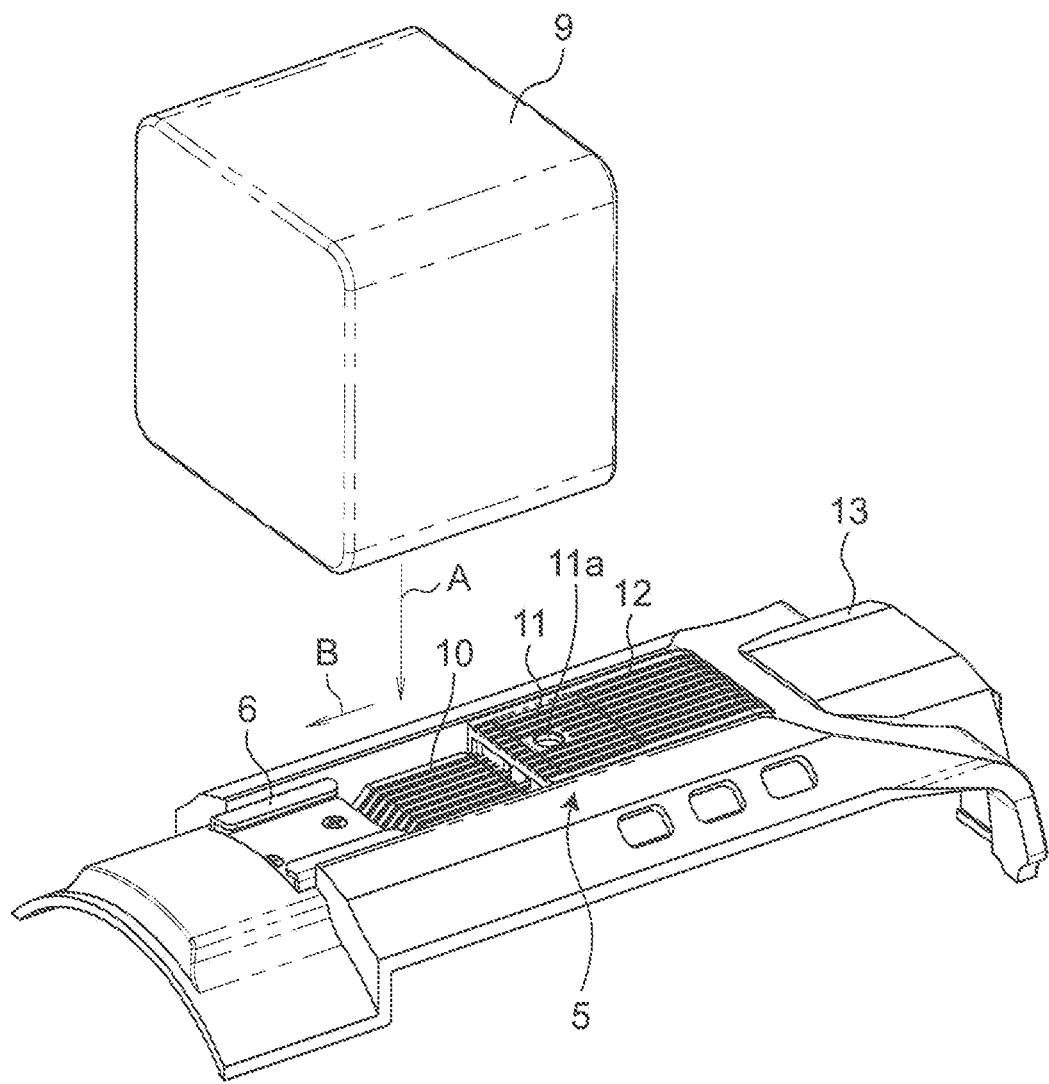
FIG. 3 is a view for illustrating an operation when an accessory component is to be mounted to a main-body side shoe in the video camera of the first embodiment.

FIG. 3 is a view for illustrating an operation when an accessory component 9 having no function of a handle such as a light or a microphone is mounted to the main-body side shoe 6 being the first engaged portion. In FIG. 3, a main-body side top cover 13 provided on the upper portion of the video camera main-body 2 as a part of the video camera main-body 2 is illustrated. When the accessory component 9 is to be mounted to the main-body side shoe 6 as indicated by the arrow in FIG. 3, a mounting/removing portion provided on the accessory component 9 is subjected to a pushing operation (first mounting operation) A against the main-body side mounting/removing portion 5 of the video camera main-body 2, and then a sliding operation (second mounting operation) B for moving the accessory component 9 forward is performed. On the other hand, when the accessory component 9 is to be removed from the main-body side shoe 6, the accessory component 9 can be removed by performing a sliding operation for moving the accessory component 9 rearward in contrary to the mounting operation.

As illustrated in FIGS. 1 and 2, the video camera 1 as the imaging device of the first embodiment has a configuration of being mountable to and removable from the video camera main-body 2 in any accessory configuration such as the accessory holding unit 3 having a function as a handle capable of supporting the video camera main-body 2 with a relatively large load applied to the mounting portion or the accessory component 9 having no function of a handle such as a light or a microphone with a relatively small load applied to the mounting portion. The main-body side mounting/removing portion 5 provided on the video camera main-body 2 of the first embodiment has a configuration which allows appropriate mounting and removing to and from each of the accessory holding unit 3 having a function of a handle for supporting a heavy object or the accessory component 9 having no function of a handle by simple operation.

Figure 4A:
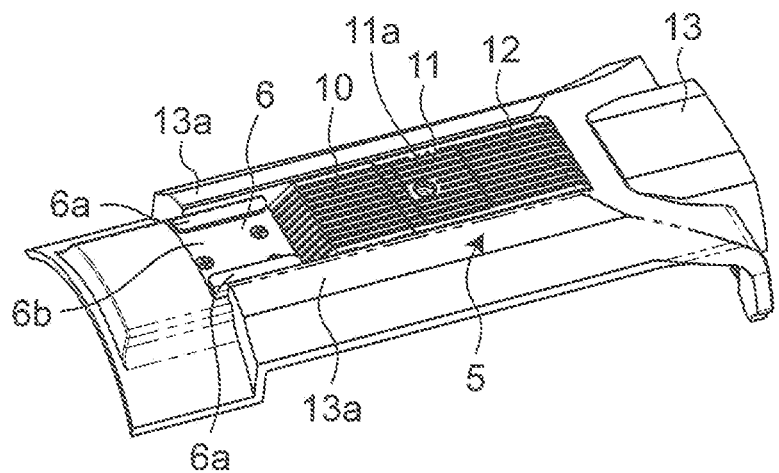
FIGS. 4A to 4C are perspective views for illustrating operations of a main-body side mounting/removing portion of a main-body side top cover in the video camera of the first embodiment.
Figure 4B:
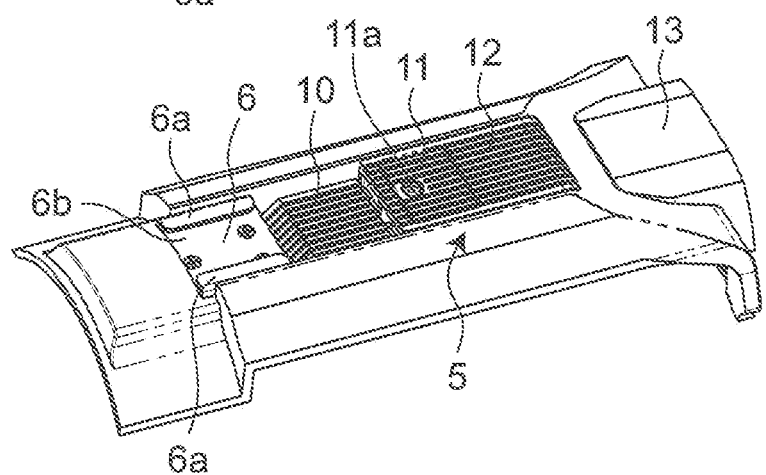
Figure 4C:
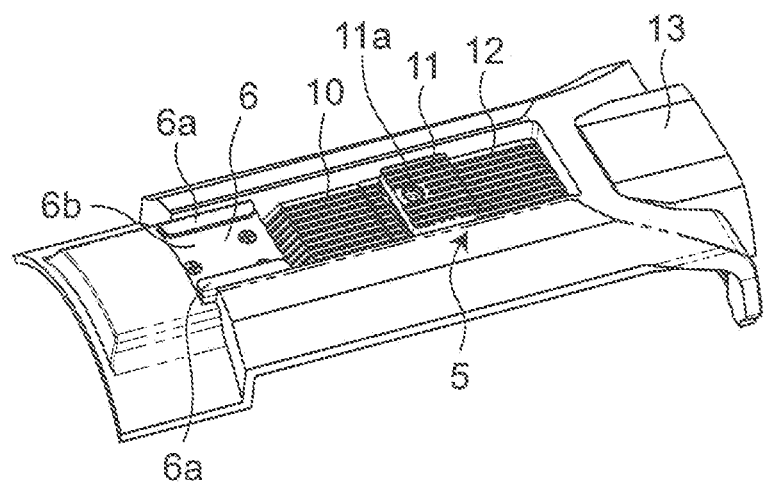

In FIGS. 4A to 4C, an operation when the accessory holding unit 3 having a function of a handle is mounted and an operation when the accessory component 9 is mounted in the main-body side mounting/removing portion 5 provided on the main-body side top cover 13 are illustrated as an operation in the main-body side mounting/removing portion 5. As illustrated in FIGS. 4A to 4C, the main-body side mounting/removing portion 5 includes a first mounting/removing movable portion disposed on the front side (left side in FIGS. 4A to 4C, a second mounting/removing movable portion (connection terminal cover) 12 disposed on the rear side, and a lock portion 11 disposed on the rear side of first mounting/removing movable portion 10 and provided so as to surround the second mounting/removing movable portion 12. The first mounting/removing movable portion 10 and the second mounting/removing movable portion 12 are configured to be lowered downward by a predetermined distance by pressing from above, and are each always urged upward by a compression spring 15 (see FIG. 6) to be held at a predetermined position (non-mounting position).

FIG. 4A illustrates a non-mounted state where neither the accessory component 9 nor the accessory holding unit 3 is mounted to the main-body side mounting/removing portion 5. In the non-mounted state, the first mounting/removing movable portion 10 and the second mounting/removing movable portion 12 are at the upper position. At this time, the upper surfaces of the first mounting/removing movable portion 10, the lock portion 11, and the second mounting/removing movable portion 12 are at substantially the same position, and form substantially the same plane. A plurality of grooves extending in the front-rear direction (sliding direction) are formed on the upper surfaces of the first mounting/removing movable portion 10, the lock portion 11, and the second mounting/removing movable portion 12 so as to be connected. By forming the grooves in this manner, the friction at the time of the sliding operation at the time of the mounting operation is reduced, and at the same time, an effect of making abrasion damage caused at the time of the sliding operation inconspicuous.

In the non-mounted state, the upper end surfaces of the main-body side shoe 6 provided on the front side of the main-body side mounting/removing portion 5 is located at almost the same position as the upper surfaces of the first mounting/removing movable portion 10, the lock portion 11, and the second mounting/removing movable portion 12. Here, the upper end surfaces of the main-body side shoe 6 refer to the upper surfaces of the sandwiching portions provided on both sides in a protruding manner.

Further, as illustrated in FIG. 4A, side covers 13a are provided on the main-body side top cover 13 in a protruding manner so as to cover at least both side surfaces of each of the first mounting/removing movable portion 10, the lock portion 11 and the second mounting/removing movable portion 12. The side covers 13a are formed parallel to the front-rear direction so as to sandwich the main-body side shoe 6, the first mounting/removing movable portion 10, the lock portion 11, and the second mounting/removing movable portion 12 at the top of the main-body side top cover 13. As described above, the side covers 13a are provided on the main-body side top cover 13 so as to cover the main-body side shoe 6, the first mounting/removing movable portion 10, the lock portion 11, and the second mounting/removing movable portion 12 from the side surfaces. Thus, the design as a video camera being the imaging device of the first embodiment is improved. In particular, although it is a general configuration that a shoe for mounting an accessory is provided so as to protrude in the outer shell of the main body, as a mounting/removing mechanism of the imaging device main-body (video camera main-body 2) of the first embodiment, the main-body side shoe 6 is hidden from the side surfaces, and is not a configuration that protrudes from the outer shell of the main body, and is a configuration that is excellent in design.

FIG. 4B illustrates an operation state in the main-body side mounting/removing portion 5 when the accessory component 9 as a single component is mounted to the main-body side shoe 6, as illustrated in FIG. 3. When the accessory component 9 with a relatively small load applied to the mounting portion is mounted to the main-body side shoe 6, as illustrated in FIG. 4B, the first mounting/removing movable portion 10 of the main-body side mounting/removing portion 5 is located at the lower position (mounting position), and the second mounting/removing movable portion 12 remains located at the upper position (non-mounting position). That is, when the first mounting/removing movable portion 10 is pushed downward to the lower position (mounting position) by the pressing of the accessory component 9, a space (mounting space) for mounting the accessory component 9 is secured on the rear side of the main-body side shoe 6. When, in the state where the mounting/removing portion of the accessory component 9 is located in the mounting space thus formed, the mounting/removing portion of the accessory component 9 is engaged with the main-body side shoe 6 by sliding the accessory component 9 forward, the accessory component 9 is brought into the mounted state. At this time, since the second mounting/removing movable portion 12 remains at the upper position (non-mounting position), the lock portion 11 is in a state of being surrounded by the second mounting/removing movable portion 12. For this reason, the outer peripheral portion (side surface portion) of the lock portion 11 is in a state of being covered and protected by the second mounting/removing movable portion 12.

FIG. 4C illustrates an operation state in the main-body side mounting/removing portion 5 when the accessory holding unit 3 having a function of the handle 4 with a relatively large load applied to the mounting portion is mounted to the main-body side mounting/removing portion 5 and the main-body side shoe 6, as illustrated in FIG. 1. When the accessory holding unit 3 including the handle 4 is to be mounted, as illustrated in FIG. 4C, by the mounting/removing mechanism described later provided in the accessory holding unit 3, the first mounting/removing movable portion 10 of the main-body side mounting/removing portion 5 is pushed downward to the lower position (mounting position), and the second mounting/removing movable portion 12 is also pushed downward to the lower position (mounting position). As described above, when the first mounting/removing movable portion 10 is pushed downward to the lower position (mounting position), a mounting space for mounting the accessory holding unit 3 is secured on the rear side of the main-body side shoe 6. At the same time, the second mounting/removing movable portion 12 of the main-body side mounting/removing portion 5 is pushed downward to the lower position (mounting position) by the pushing operation A in which the accessory holding unit 3 presses the main-body side mounting/removing portion 5 and the main-body side shoe 6. Therefore, the outer peripheral portion (side surface portions) of the lock portion 11 fixed to the video camera main-body 2 is exposed, and is not covered by the second mounting/removing movable portion 12.

In the configuration of the first embodiment, as described later, when the second mounting/removing movable portion 12 is pushed downward, the first mounting/removing movable portion 10 is pushed downward in conjunction therewith. In contrast, even when the first mounting/removing movable portion 10 is pushed downward, the second mounting/removing movable portion 12 is not pushed downward.

FIGS. 5A and 5B are perspective views for illustrating the mounted state illustrated in FIGS. 4B and 4C as seen from the rear to the front. The state illustrated in FIG. 5A corresponds to a state when the accessory component 9 illustrated in FIG. 4B is mounted, and the state illustrated in FIG. 5B corresponds to a state when the accessory holding unit 3 illustrated in FIG. 4C is mounted. As illustrated in FIG. 5B, when the accessory holding unit 3 is mounted, the outer peripheral portion (side surface portions) of the lock portion 11 of the main-body side mounting/removing portion 5 is not covered by the second mounting/removing movable portion 12 and is in an exposed state. At this time, a connection terminal portion 14 having an electrical contact being a first connection terminal provided on the rear side surface of the lock portion 11 is in an exposed state. Therefore, the second mounting/removing movable portion 12 has a function as a connection terminal cover. In addition, the second mounting/removing movable portion 12 has a function of preventing mixing of dust and the like into lock grooves 11b (second engaged portions) provided in the side surfaces of the lock portion 11 as well as the function of protecting the connection terminal portion 14 in the non-mounted state.

As described above, when the accessory holding unit 3 is pushed against the main-body side mounting/removing portion 5 and the main-body side shoe 6 (pushing operation A), the connection terminal portion 14 being the first connection terminal of the main-body side is brought into the exposed state. In this exposed state, when the accessory holding unit 3 performs the sliding operation B, a connection terminal portion 24 (see FIG. 7) having an electrical contact being a second connection terminal provided on the accessory holding unit 3 into the connection terminal portion 14 on the main-body side, so that the accessory holding unit 3 is brought into an electrically connected state.

[Mounting/Removing Mechanism of Video Camera Main-Body]

Figure 6:
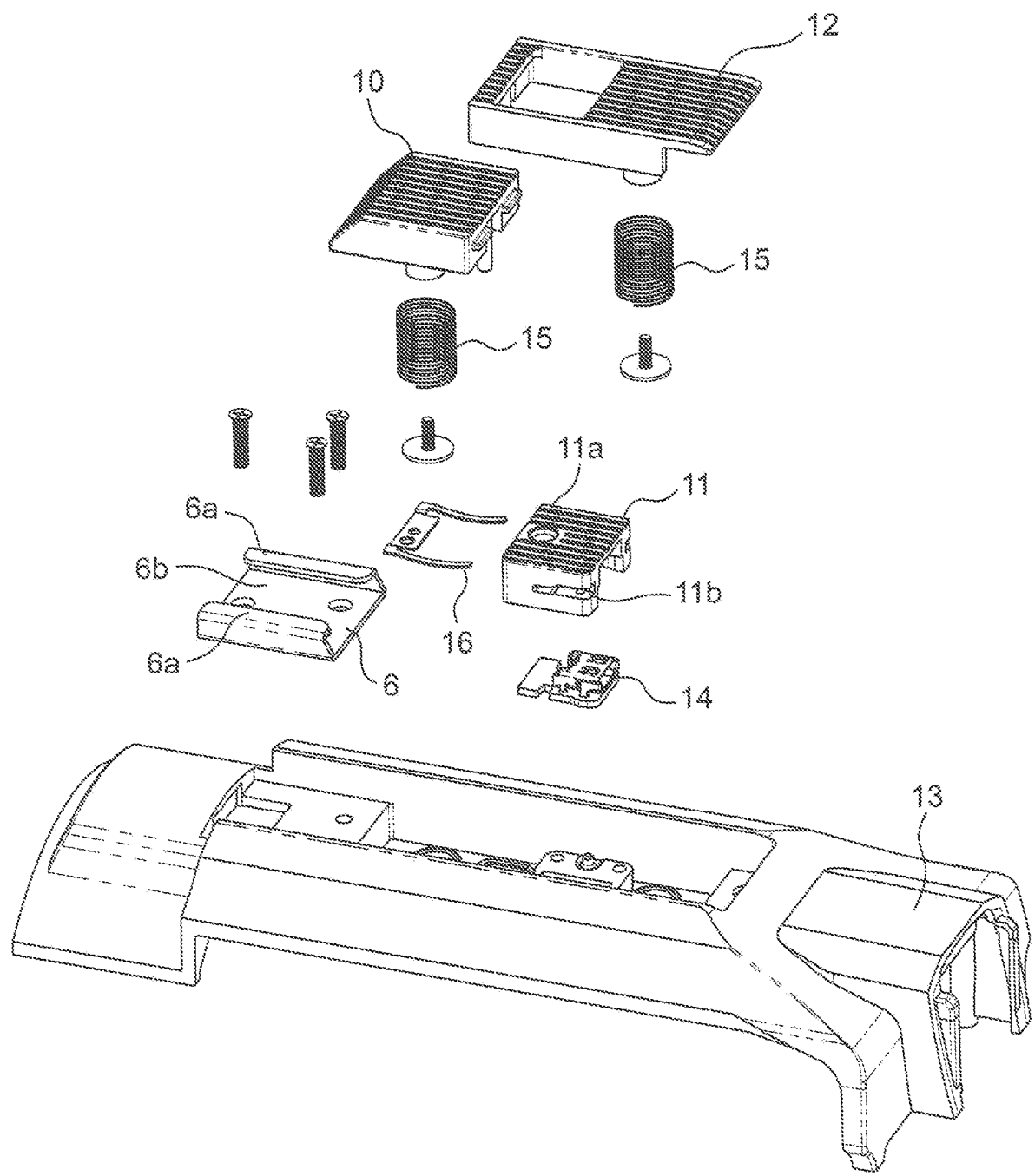
FIG. 6 is an exploded perspective view for illustrating the main-body side mounting/removing portion of the main-body side top cover in the video camera of the first embodiment.

FIG. 6 is an exploded perspective view of the main-body side mounting/removing portion 5 provided on the main-body side top cover 13. As illustrated in FIG. 6, the first mounting/removing movable portion 10 and the second mounting/removing movable portion 12 are each urged upward by the compression spring 15, and, in the non-mounted state where a device is not mounted to the main-body side shoe 6 or the main-body side mounting/removing portion 5 and the main-body side shoe 6, the first mounting/removing movable portion 10 and the second mounting/removing movable portion 12 are disposed at the same upper position (non-mounting position).

As described above, when the accessory component 9 is to be mounted to the main-body side shoe 6, only the first mounting/removing movable portion 10 is pressed and moved to the lower position (mounting position), and the second mounting/removing movable portion 12 does not move and is maintained at the upper position (non-mounting position) as it is. Accordingly, in this state, the outer peripheral portion (side surface portion) of the lock portion 11 is in a state of being covered by the second mounting/removing movable portion (connection terminal cover) 12, and the connection terminal portion (main-body side) 14 of the lock portion 11 is not in an exposed state and is maintained in the covered state.

On the other hand, when the accessory holding unit 3 having the function of the handle 4 is to be mounted to the main-body side mounting/removing portion 5 and the main-body side shoe 6, the second mounting/removing movable portion 12 is pushed downward, and the first mounting/removing movable portion 10 is pushed downward in conjunction therewith. As a result, the connection terminal portion 14 of the lock portion 11 of the main-body side mounting/removing portion 5 is in an exposed state, and the connection terminal portion 24 of the accessory holding unit 3 is in a state of being insertable into the connection terminal portion 14, so that the connection terminal portion (main-body side) 14 and the connection terminal portion (accessory side) 24 can be electrically connected.

As illustrated in FIG. 6, the main-body side shoe 6 being the first engaged portion is fixed to the main-body side top cover 13 with screws, and is reliably mounted to the mounting/removing mechanism provided on the side of the device to be mounted. Further, the lock portion 11 of the main-body side mounting/removing portion 5 provided on the rear side of the main-body side shoe 6 is also fixed to the main-body side top cover 13 and does not move. In the upper surface (surface to which the accessory holding unit 3 is mounted) of the lock portion 11 in the first embodiment, a lock hole 11a being a bottomed locked portion is formed. Further, the lock grooves 11b being the second engaged portions, which are grooves having a predetermined distance from the rear side, are formed in both the side surfaces of the lock portion 11. As described later, fixing members (lock pin 22 and lock plate 26) in the mounting/removing mechanism provided to accessory holding unit 3 are configured to be mountable to the lock hole 11a and the lock grooves 11b.

Pressing springs 16 are mounted to the lock grooves 11b being the second engaged portions of the lock portion 11, and as described later, lock claws 26a being second engaging portions provided to the mounted accessory holding unit 3 are pressed to maintain the mounted state (engagement state) of the lock grooves 11b and the lock claws 26a and prevent the accessory holding unit 3 mounted to the video camera main-body 2 from being wobbled. In addition, since the lock portion 11 functions as a fixing member, a material having rigidity and high wear resistance is used, and in the first embodiment, the lock portion 11 is formed of a metal material which can be easily processed.

[Mounting/Removing Mechanism of Accessory Holding Unit 3]

Figure 7:
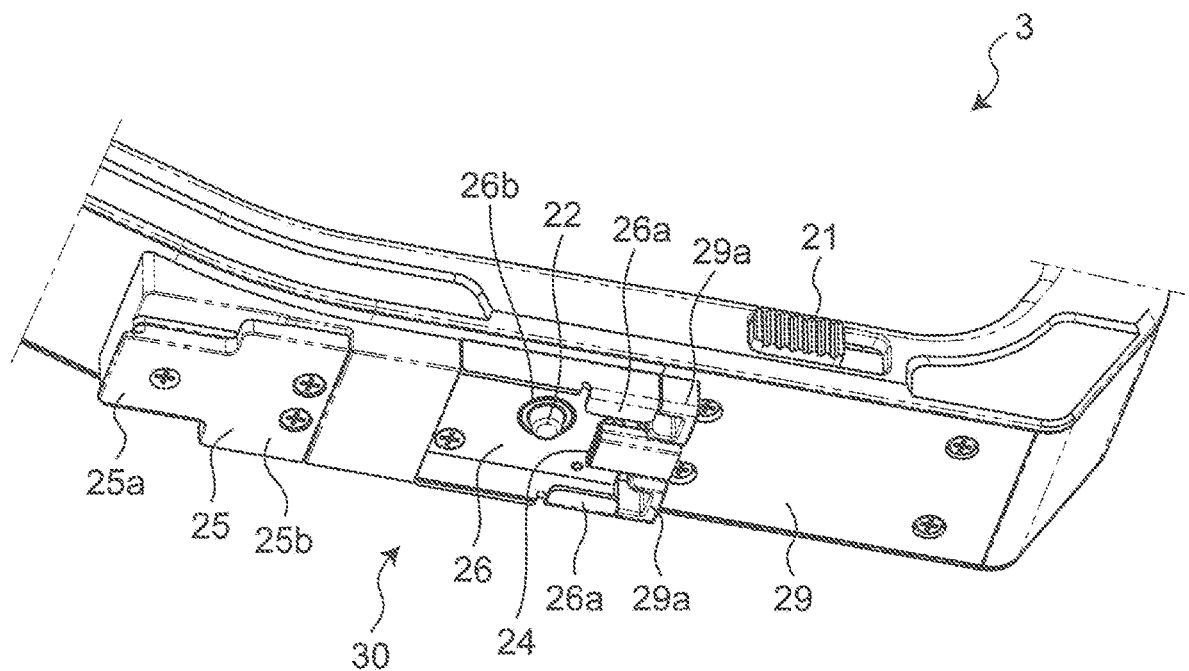
FIG. 7 is a perspective view for illustrating a mounting/removing mechanism of an accessory holding unit in the first embodiment.

FIG. 7 is a perspective view for illustrating the mounting/removing mechanism 30 of the accessory holding unit 3 having the function of the handle 4 in the first embodiment. In FIG. 7, a part of the accessory holding unit 3 is illustrated, and a lower surface serving as a mounting surface of the accessory holding unit 3 (surface facing the video camera main-body 2) is mainly illustrated. In FIG. 7, the left side corresponds to the front side of the video camera 1.

As illustrated in FIG. 7, the mounting/removing mechanism provided to the lower surface of the accessory holding unit 3 is provided with a lock blade 25 being a first fixation member is provided on the front side, and a lock plate 26 being a second fixation member is provided on the rear side. A through hole 26b is formed in the lock plate 26, and a lock pin 22 being a locking portion movable up and down inside the through hole 26b is disposed. The lock pin 22 being the locking portion serves as a third fixing member. Further, the mounting/removing mechanism of the accessory holding unit 3 is provided with the connection terminal portion (accessory side) 24 having the electric contact on the rear side.

As illustrated in FIG. 7, the lock blade 25 of the accessory holding unit 3 is a flat plate member fixed to the main-body side shoe 6 and has a narrow portion 25a with a narrow lateral width on the front side and a wide portion 25b with a wide lateral width on the rear side. The narrow portion 25a of the lock blade 25 is disposed between shoe claws 6a provided on both sides of the main-body side shoe 6 in a protruding manner in the downward pushing operation (first mounting operation) A in the mounting operation. In this state, the sliding operation (second mounting operation) B for moving the accessory holding unit 3 forward is performed, so that the wide portion 25b of the lock blade 25 is inserted between a shoe base 6b and the shoe claws 6a of the main-body side shoe 6 to be pinched (engaged) (See FIG. 6).

As a result, the wide portion 25b of the lock blade 25 is held securely by the main-body side shoe 6. At this time, the wide portion 25b of the lock blade 25 is pressed by the pressing springs 17 (see FIG. 8) provided between the shoe claws 6a and the shoe base 6b and is strongly pinched (engaged).

In the connection terminal portion (accessory side) 24 being the second connection terminal having the electrical contact provided on the rear side of the mounting/removing mechanism 30 of the accessory holding unit 3, by the sliding operation (second mounting operation) B for moving the accessory holding unit 3 forward, the connection terminal portion 14 (see FIG. 5B) being the first connection terminal provided on the main-body side mounting/removing portion 5 being the mounting/removing mechanism of the video camera main-body 2 is electrically connected.

Figure 8:
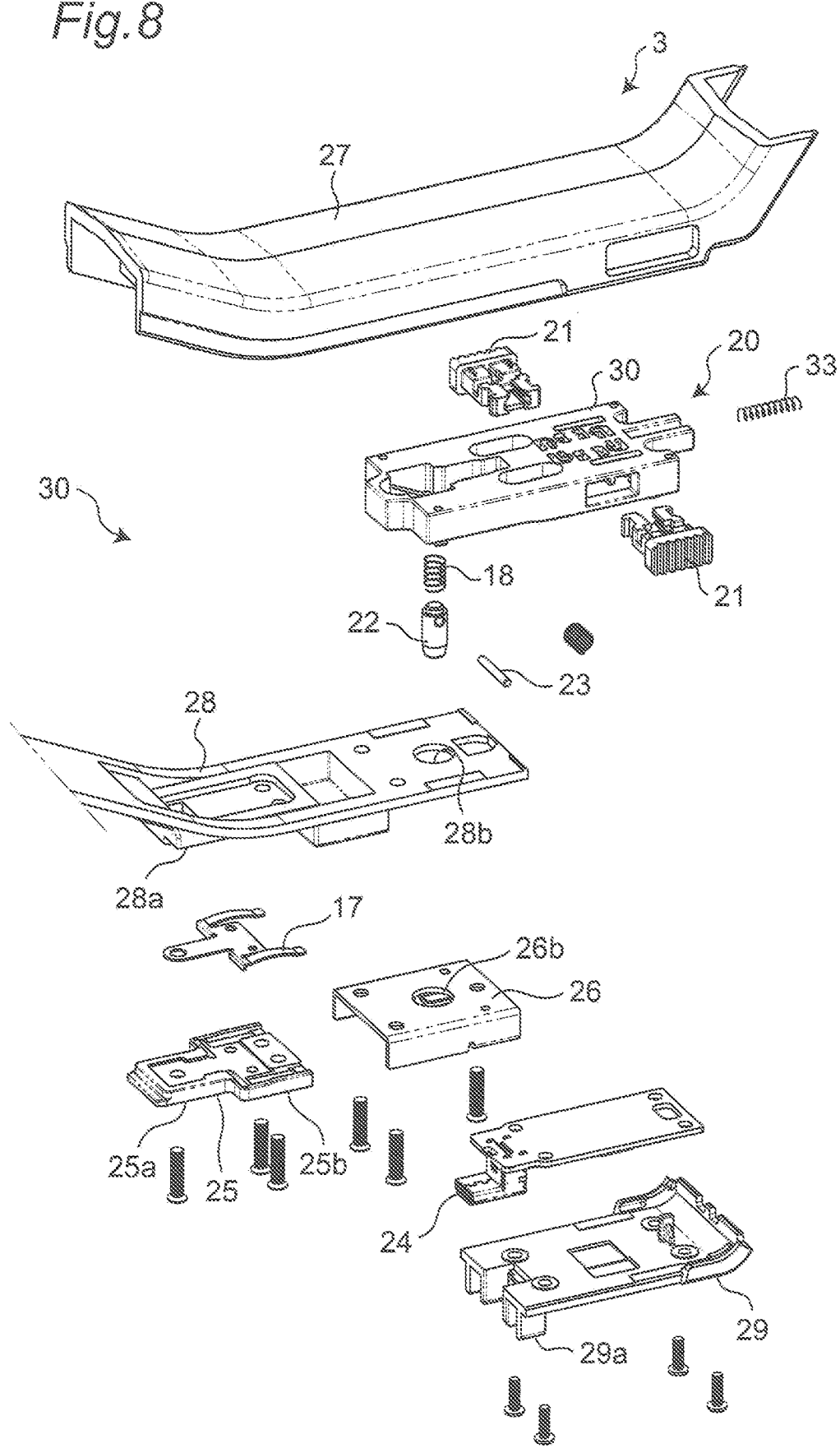
FIG. 8 is an exploded perspective view of the mounting/removing mechanism of the accessory holding unit in the first embodiment.
Figure 9:
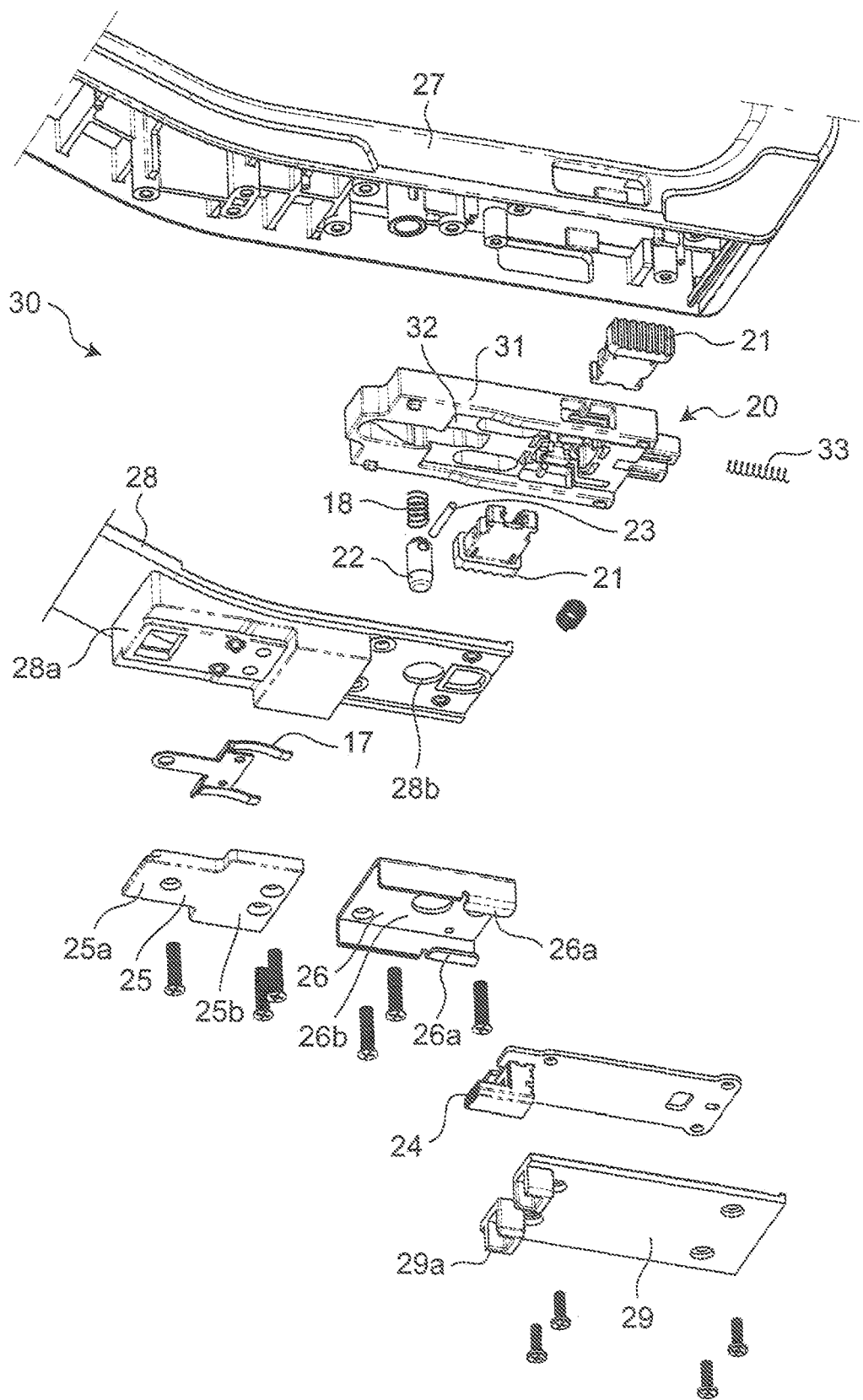
FIG. 9 is an exploded perspective view of the mounting/removing mechanism of the accessory holding unit in the first embodiment.

FIGS. 8 and 9 are exploded perspective views of the mounting/removing mechanism 30 of the accessory holding unit 3 illustrated in FIG. 7. FIG. 8 is a perspective view seen from above, and FIG. 9 is a perspective view seen from below. As illustrated in FIGS. 8 and 9, the upper surface side of the mounting/removing mechanism 30 of the accessory holding unit 3 is covered by an accessory case 27, and a back surface cover 28 and a terminal protection cover 29 are provided on the lower surface side. The terminal protection cover 29 is provided with two projecting terminal protection portions 29a, and the two terminal protection portions 29a are provided so as to sandwich the connection terminal portion 24 therebetween. The terminal protection portions 29a of the terminal protection cover 29 has a protection function to prevent direct contact with the connection terminal portion 24 when, for example, the accessory holding unit 3 is placed on a table with the connection terminal portion 24 facing downward.

A lock blade support 28a is formed on the back surface cover 28 of the accessory holding unit 3. The lock blade support 28a is a portion to which the lock blade 25 is fixed, and is fixed by fixing means such as a screw, for example. However, both end sides in the width direction of the wide portion 25b of the lock blade 25 are fixed to the lock blade support 28a so as to have gaps. This gaps are gaps into which the shoe claws 6a of the main-body side shoe 6 of the video camera main-body 2 are inserted in the sliding operation (second mounting operation) B. Pressing springs 17 are provided in the gaps, and the pressing springs 17 are fixed to the wide portion 25b of the lock blade 25. By providing the pressing springs 17 in the gaps in this manner, when the shoe claws 6a of the main-body side shoe 6 are inserted into the gaps, the shoe claws 6a are pressed by the pressing springs 17, so that the lock blade 25 is held securely by the main-body side shoe 6.

The lock plate 26 is provided on the rear side of the lock blade support 28a in the back surface cover 28. A through hole 28b is formed in the back surface cover 28 at a position corresponding to the through hole 26b of the lock plate 26. The lock pin 22 is disposed so as to penetrate through the through hole 28b of the back surface cover 28 and the through hole 26b of the lock plate 26. The lock pin 22 being the locking portion has a mechanism that moves up and down as described later, and is disposed at either a locked position (lower position) or an unlocked position (upper position).

The lock pin 22 is penetrated by a pin support bar 23 having a central axis parallel to a direction orthogonal to the up and down movement direction. The pin support bar 23 is movably held by an unlocking portion 20 having an unlocking mechanism. The unlocking portion 20 includes an unlocking case 31, a pin support portion 32 (see FIGS. 10 and 11) configured to be movable back and forth inside the unlocking case 31, and unlocking knobs 21 for enabling the movement of the pin support portion 32.

Figure 10A:
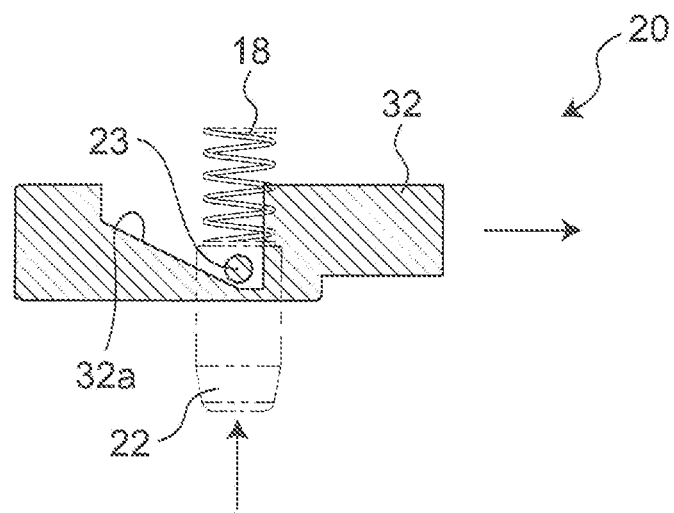
FIGS. 10A and 10B are cross-sectional views for schematically illustrating operations of an unlocking portion in the first embodiment.
Figure 10B:
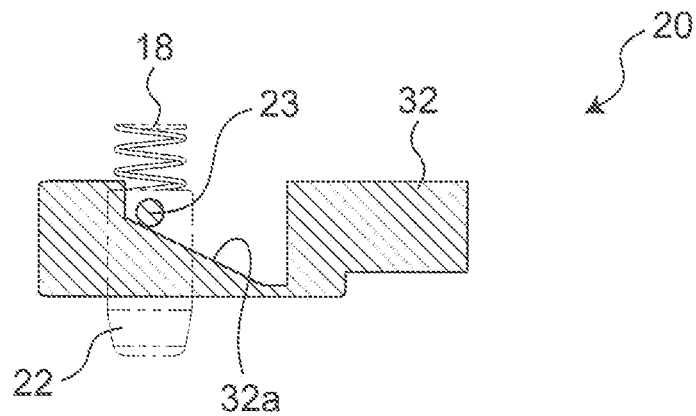

FIGS. 10A and 10B schematically illustrate an operation for defining the position by the pin support bar 23 penetrating the lock pin 22 in the unlocking portion 20. As illustrated in FIGS. 10A and 10B, a slope 32a is formed on the pin support portion 32 of the unlocking portion 20, and the slope 32a supports the pin support bar 23 penetrating the lock pin 22, so that the pin support bar 23 slides on the slope 32a. Therefore, when the pin support portion 32 of the unlocking portion 20 moves to the front and back positions, the lock pin 22 moves to the up and down positions. That is, as illustrated by the arrow in 10A, when the pin support portion 32 moves rearward, the pin support bar 23 moves up along the slope 32a, and the lock pin 22 moves to the upper position (unlocked position) (see FIG. 10B). On the other hand, when the pin support portion 32 moves forward (in the left direction in FIG. 10B) from the upper position (unlocked position) illustrated in FIG. 10B, the pin support bar 23 moves down along the slope, and the lock pin 22 moves to the lower position (locked position). In the configuration of the first embodiment, since the pin support portion 32 is always urged rearward by urging means (for example, a spring or the like), normally, as illustrated in FIG. 10A, the lock pin 22 is at the lower position (locked position).

Figure 11A:
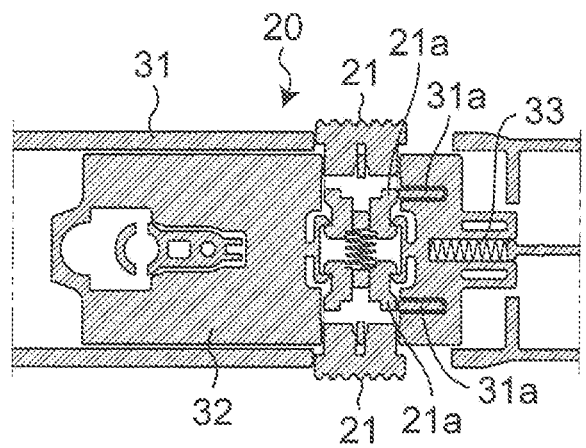
FIGS. 11A to 11C are cross-sectional views for illustrating operations of unlocking knobs and a pin support portion of an unlocking portion in the first embodiment.
Figure 11B:
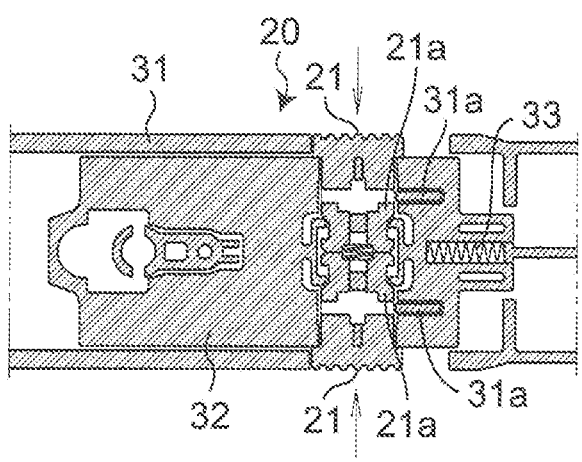
Figure 11C:
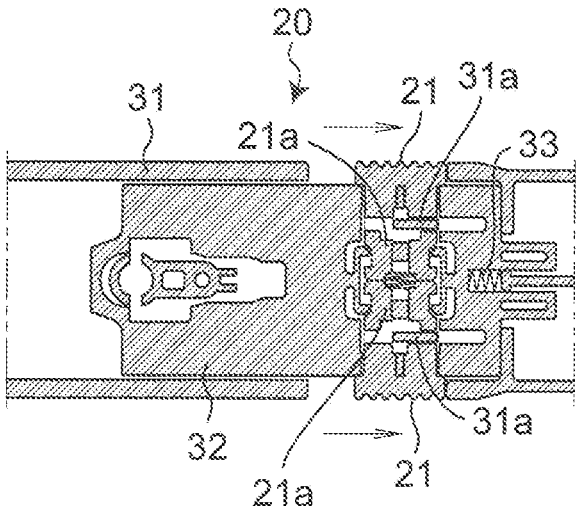

FIGS. 11A, 11B and 11C are cross-sectional views for illustrating the operations of the unlocking knobs 21 and the pin support portion 32 in the unlocking portion 20. In the cross-sectional views illustrated in FIGS. 11A, 11B and 11C, in order to illustrate the relationship between the operations of the unlocking knobs 21 and the pin support portion 32 in the unlocking portion 20, the vicinity of the unlocking knobs 21 is illustrated in a plane cross section. FIG. 11A illustrates a locked state where the accessory holding unit 3 is mounted to the video camera main-body 2 and the accessory holding unit 3 is fixed to the video camera main-body 2. That is, in the locked state illustrated in FIG. 11A, the lock pin 22 is at the lower position (locked position), and the lock pin 22 is in a state of being fitted into (engaged with) the lock hole 11a of the lock portion 11 of the video camera main-body 2.

In the locked state illustrated in FIG. 11A, when the accessory holding unit 3 is to be removed from the video camera main-body 2, as illustrated in FIG. 11B, the two unlocking knobs 21 protruding rightward and leftward from both the side surfaces of the accessory case 27 (unlocking case 31) are simultaneously pressed inward. This can be performed by an operation of gripping the two unlocking knobs 21 protruding from both the side surfaces of the unlocking case 31 with the fingers of one hand so as to pinch both the sides. As described above, when the two unlocking knobs 21 simultaneously move inward, knob locking portions 21a formed inside the unlocking knobs 21 move, and the locked state between projecting portions 31a formed on the unlocking case 31 and the knob locking portions 21a is canceled, so that the unlocking knobs 21 are in a state of being capable of being moved rearward (see FIG. 11B).

In the state illustrated in FIG. 11B, by moving the unlocking knobs 21 rearward (in the right direction in FIG. 11B), the pin support portion 32 that slides inside the unlocking case 31 moves rearward together with the unlocking knobs 21 (see FIG. 11C). As a result, as illustrated in FIG. 10B referred to above, the lock pin 22 is moved to the upper position (unlocked position). As described above, when the accessory holding unit 3 is to be removed from the video camera main-body 2, the two unlocking knobs 21 are gripped with the fingers of one hand so as to pinch both the sides, and are pulled rearward. In this manner, the accessory holding unit 3 can be easily removed from the video camera main-body 2. That is, in the video camera 1 of the first embodiment, when the accessory holding unit 3 including the handle 4 is to be removed, the accessory holding unit 3 can be easily removed by substantially one removing operation of pinching and pulling the unlocking knobs 21 with one hand.

In the above-mentioned removing operation, it is required to simultaneously press the two unlocking knobs 21 protruding from both the side surfaces of the accessory case 27, and the accessory holding unit 3 cannot be removed from the video camera main-body 2 without performing the operation of pulling the two unlocking knobs 21 while pressing the two unlocking knobs 21. Therefore, although the accessory holding unit 3 can be easily removed from the video camera main-body 2, the accessory holding unit 3 does not come off the video camera main-body 2 due to an unexpected impact or the like, thereby achieving a highly-safety and highly-reliable configuration.

For example, a compression spring 33 being an urging means is provided between the pin support portion 32 and the unlocking case 31. Therefore, the unlocking knobs 21 and the pin support portion 32 are always urged forward with respect to the unlocking case 31. Therefore, the lock pin 22 is always at the lower position (locked position). By pinching the unlocking knobs 21 on both the sides and pulling those rearward, the lock pin 22 moves to the upper position (unlocked position), and by releasing the hand from the unlocking knobs 21, the lock pin 22 returns to the lower position (locked position). Further, since biasing means such as a spring is provided between the two unlocking knobs 21, the two unlocking knobs 21 always protrude from both the side surfaces of the accessory case 27.

[Mounting/Removing Operation of Accessory Holding Unit to and from the Video Camera Main-Body]

Figure 12A:
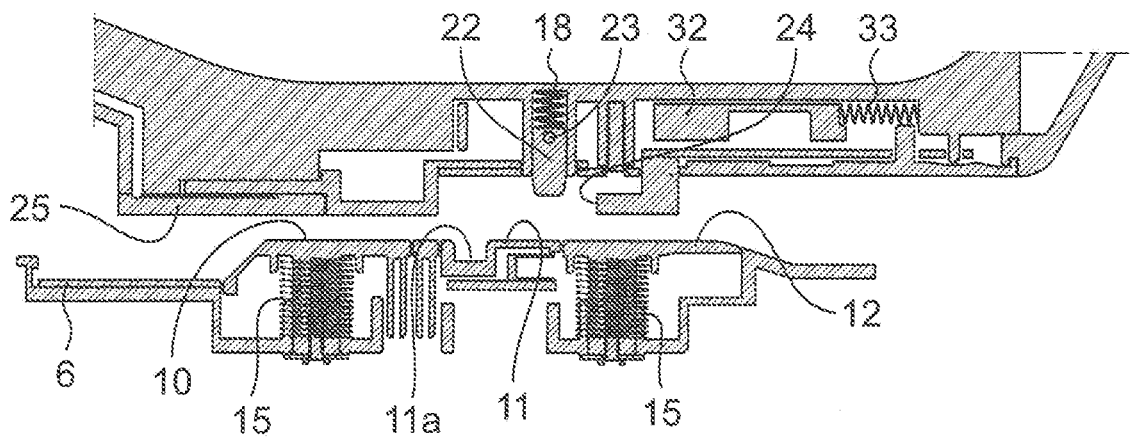
FIGS. 12A to 12C are cross-sectional views for illustrating a mounting operations of the accessory holding unit to the video camera main-body in the first embodiment.
Figure 12B:
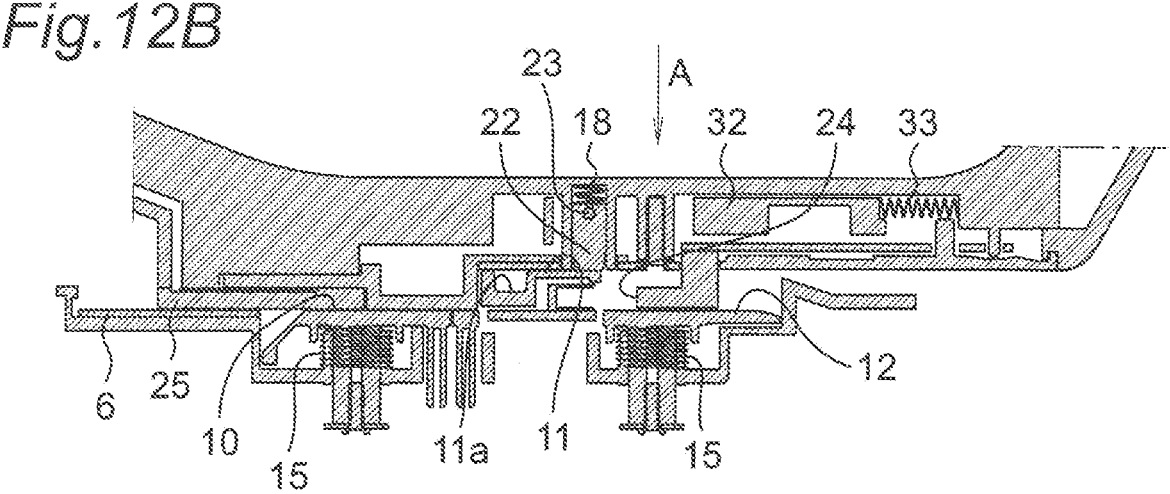
Figure 12C:
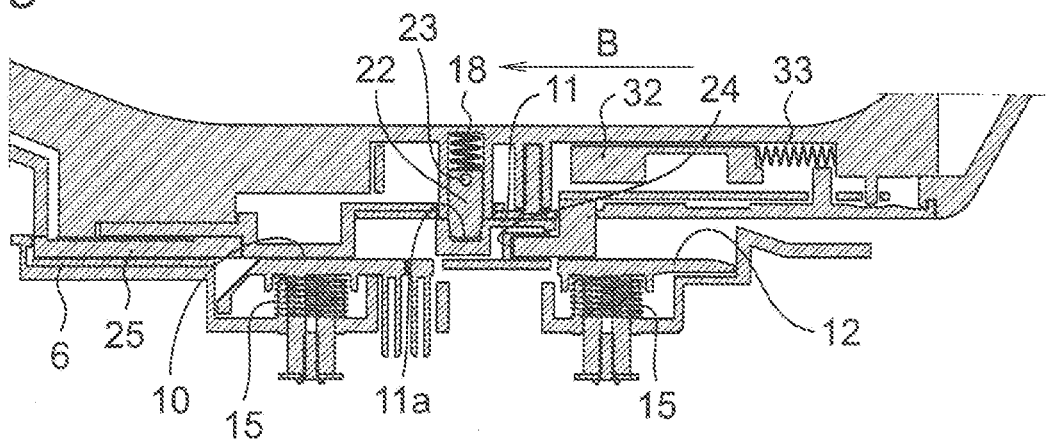

FIGS. 12A to 12C are cross-sectional views for illustrating the mounting operation of the accessory holding unit 3 to the video camera main-body 2, and each illustrate each position of the mounting/removing mechanism by the end surface. FIG. 12A illustrates each position of the mounting/removing mechanism before mounting. That is, in the state illustrated in FIG. 12A, the lock pin 22 is at the protruding lower position (locked position), and the unlocking knobs 21 are in a state of protruding from both the side surfaces (state in FIG. 11A).

FIG. 12B illustrates a state after the accessory holding unit 3 is pushed against a predetermined position of the video camera main-body 2 (pushing operation A) in the state before mounting illustrated in FIG. 12A. As illustrated in FIG. 12B, the lock pin 22 abuts on the upper surface of the lock portion 11 of the video camera main-body 2 and moves to the upper position (unlocked position). Therefore, the mounting/removing mechanism 30 of the accessory holding unit 3 is in a state of being capable of moving forward on the mounting/removing mechanism (main-body side mounting/removing portion 5) of the video camera main-body 2 (sliding operation B).

FIG. 12C illustrates a state where the accessory holding unit 3 is moved forward (sliding operation B), and the mounting/removing mechanism 30 of the accessory holding unit 3 is mounted to the mounting/removing mechanism (main-body side mounting/removing portion 5) of the video camera main-body 2. In the mounted state illustrated in FIG. 12C, the wide portion 25b (first engaging portion) of the lock blade 25 provided on the front side of the mounting/removing mechanism 30 of the accessory holding unit 3 is inserted into the main-body side shoe 6 (first engaged portion) of the mounting/removing mechanism of the video camera main-body 2 to be mounted (engaged). At this time, the lock claws 26a (second engaging portions) of the lock plate 26 provided on the rear side of the mounting/removing mechanism 30 of the accessory holding unit 3 are inserted into the lock grooves 11b (second engaged portions) of the lock portion 11 of the mounting/removing mechanism of the video camera main-body 2 to be mounted (engaged). Furthermore, as illustrated in FIG. 12C, the lock pin 22 (locking portion) of the mounting/removing mechanism 30 of the accessory holding unit 3 is fitted into the lock hole 11a (locked portion) of the lock portion 11 of the mounting/removing mechanism of the video camera main-body 2 to be mounted (locked).

As described above, in the mounted state illustrated in FIG. 12C, the wide portion 25b (first engaging portion) of the lock blade 25 is engaged with the main-body side shoe 6 (first engaged portion) (first fixation), the lock claws 26a (second engaging portions) of the lock plate 26 are engaged with the lock grooves 11b (second engaged portions) of the lock portion 11 (second fixation), and the lock pin 22 (locking portion) is engaged with the lock hole 11a (locked portion) of the lock portion 11 (third fixation). As a result, the accessory holding unit 3 is in a state of being fixed to the video camera main-body 2 at three points, and the highly-safety and highly-reliable mounted state where the accessory holding unit 3 is securely held is obtained.

Figure 13A:
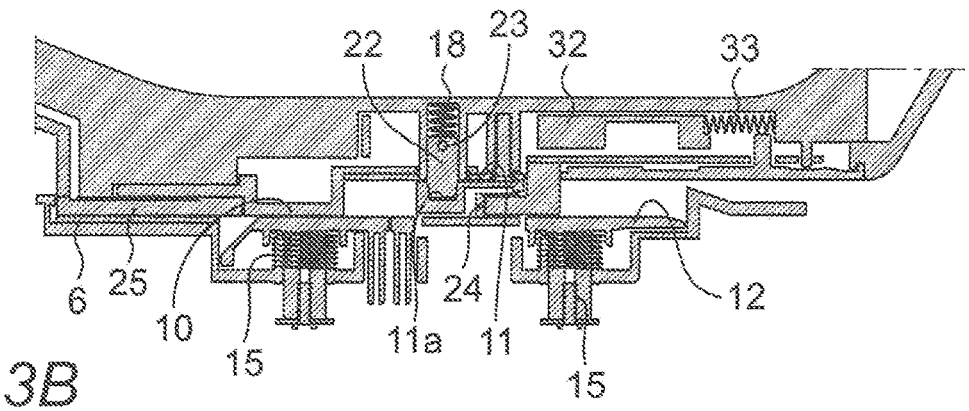
FIGS. 13A to 13D are cross-sectional views for illustrating removing operations of the accessory holding unit from the video camera main-body in the first embodiment.

FIGS. 13A to 13D are cross-sectional views for illustrating the removing operation of the accessory holding unit 3 to the video camera main-body 2, and each illustrate each position of the mounting/removing mechanism by the end surface. FIG. 13A illustrates each position of the mounting/removing mechanism in the mounted state. That is, the mounted state illustrated in FIG. 13A is the same as the state illustrated in FIG. 12C referred to above, the lock pin 22 is at the protruding lower position (locked position), and the unlocking knobs 21 are in a state of protruding from both the side surfaces of the accessory case 27 (unlocking case 31).

Figure 13B:
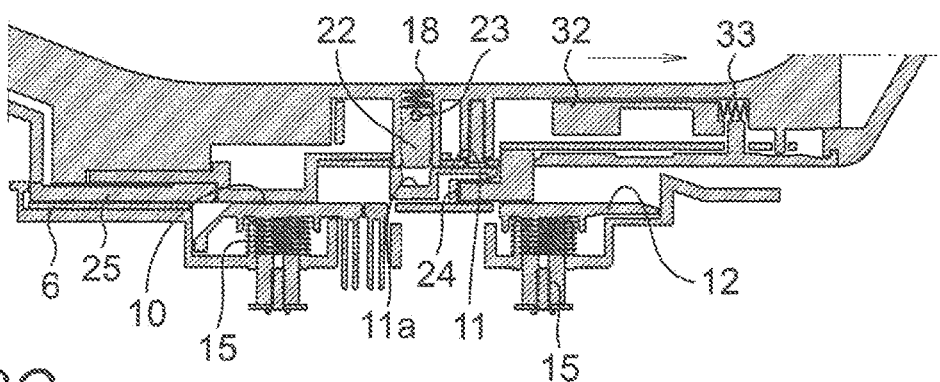

FIG. 13B illustrates the state where the two unlocking knobs 21 protruding from both the side surfaces of the accessory case 27 are pressed (pinching operation) and pulled rearward to move the lock pin 22 to the upper position (unlocked position). That is, at this time, the lock pin 22 (locking portion) is at a position shifted from the lock hole 11a (locked portion) of the lock portion 11. In the state illustrated in FIG. 13B, the position of the accessory holding unit 3 with respect to the video camera main-body 2 remains at the position in the mounted state.

Figure 13C:
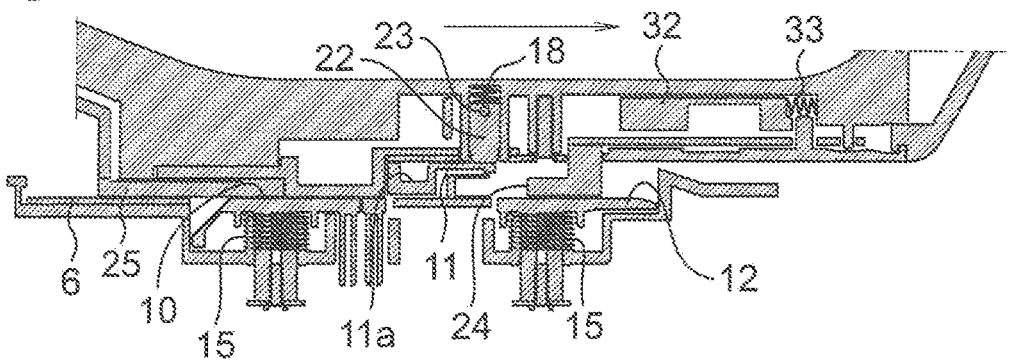
Figure 13D:
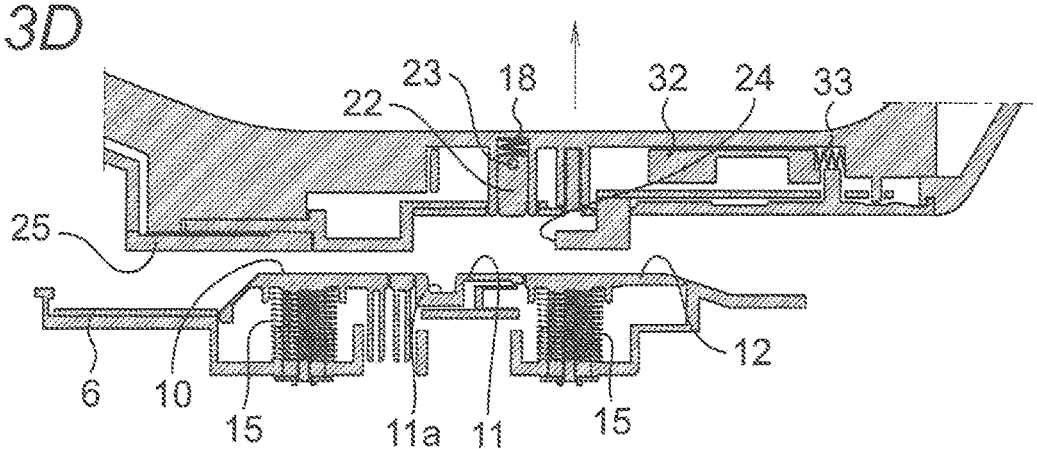

FIG. 13C illustrates a state after the sliding operation in which the accessory holding unit 3 is moved rearward in the state illustrated in FIG. 13B. Therefore, in the state illustrated in FIG. 13C, the wide portion 25b (first engaging portion) of the lock blade 25 is disengaged from the main-body side shoe 6 (first engaged portion), the lock claws 26a (second engaging portions) of the lock plate 26 are disengaged from the lock grooves 11b (second engaged portions) of the lock portion 11, and the lock pin 22 (locking portion) is disengaged from the lock hole 11a (locked portion) of the lock portion 11. As a result, the accessory holding unit 3 can be lifted from the video camera main-body 2, and the accessory holding unit 3 is in a state of being completely removed from the video camera main-body 2 (see FIG. 13D).

Figure 14A:
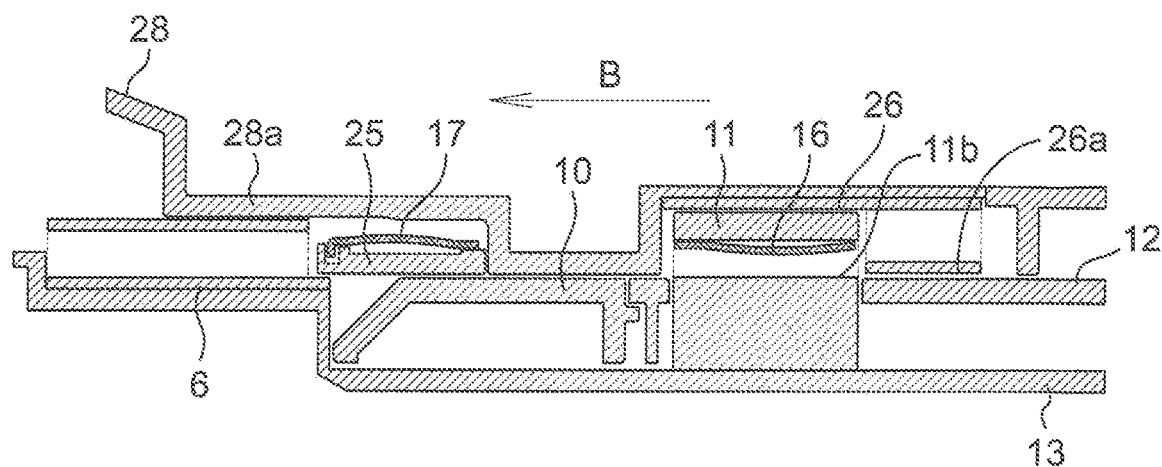
FIGS. 14A and 14B are cross-sectional views for illustrating first fixation and second fixation by a sliding operation in the first embodiment.
Figure 14B:
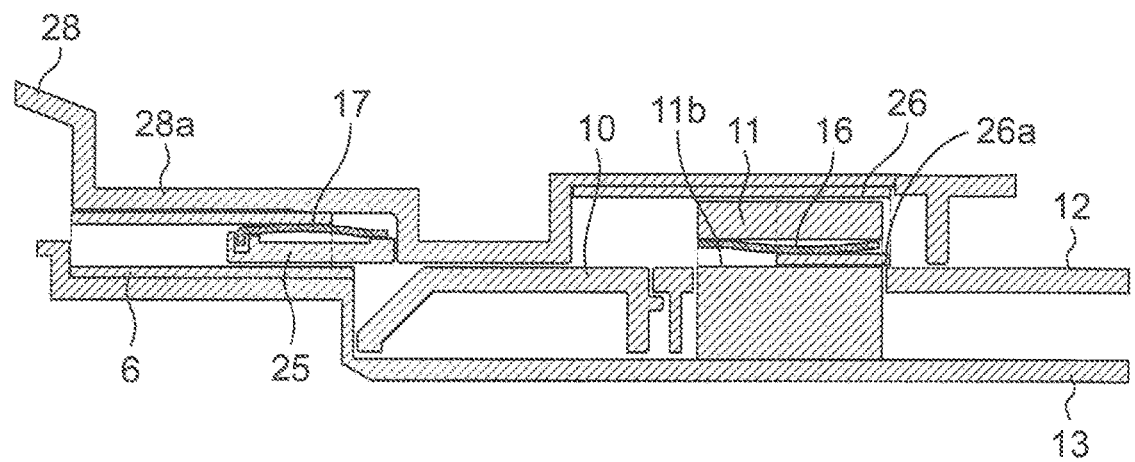

FIGS. 14A and 14B are cross-sectional views for illustrating the first fixation by the sliding operation B between the main-body side shoe 6 (first engaged portion) and the wide portion 25b (first engaging portion) of the lock blade 25, and the second fixation by the sliding operation B between the lock grooves 11b (second engaged portions) of the lock portion 11 and the lock claws 26a (second engaging portions) of the lock plate 26. In FIGS. 14A and 14B, the respective fixing members are illustrated by the end surfaces. The state illustrated in FIG. 14A illustrates the state immediately before the sliding operation B after the pushing operation A is performed. The state illustrated in FIG. 14B illustrates a mounted state after the sliding operation. In the mounted state illustrated in FIG. 14B, as described above, the accessory holding unit 3 can be easily removed from the video camera main-body 2 by pressing the two unlocking knobs 21 protruding from both the sides and pulling those rearward to perform the removing operation (sliding operation).

As illustrated in FIGS. 14A and 14B, in the gaps into which the shoe claws 6a of the main-body side shoe 6 (first engaged portion) of the video camera main-body 2 are inserted, the pressing springs 17 are provided on the upper surface of the wide portion 25b (first engaging portion) of the lock blade 25 of the accessory holding unit 3 (see FIG. 8). For this reason, when the shoe claws 6a of the main-body side shoe 6 (first engaged portion) are inserted into the gaps in which the pressing springs 17 are provided by the sliding operation B, the shoe claws 6a are pressed by the pressing springs 17 to be held. As a result, the lock blade 25 of the accessory holding unit 3 is in a state of being securely fixed to the main-body side shoe 6 of the video camera main-body 2 (first fixation).

Further, as illustrated in FIGS. 14A and 14B, the pressing springs 16 are provided in the lock grooves 11b (second engaged portions) of the lock portion 11 of the video camera main-body 2 (see FIG. 6). Therefore, when the lock claws 26a (second engaging portions) of the lock plate 26 of the accessory holding unit 3 are inserted into the lock grooves 11b in which the pressing springs 16 are provided, the lock claws 26a (second engaging portions) are pressed by the pressing springs 16. As a result, the lock plate 26 of the accessory holding unit 3 is in a state of being securely fixed to the lock portion 11 of the video camera main-body 2 (second fixation).

As described above, when the accessory holding unit 3 including an accessory with a load to be applied such as the handle 4 capable of supporting a heavy object is to be mounted to the video camera main-body 2 being the imaging device main-body, the accessory holding unit 3 is subjected to the pushing operation (first mounting operation) A against the video camera main-body 2 and the sliding operation (second mounting operation) B, so that the accessory holding unit 3 is in a state of being fixed in position at three points. That is, in the configuration of the first embodiment, by performing a series of mounting operations of the pushing operation (first mounting operation) A and the sliding operation (second mounting operation) B, it is possible to simultaneously perform the first fixation in which the lock blade 25 of the accessory holding unit 3 is inserted into the main-body side shoe 6 of the video camera main-body 2 to be engaged, the second fixation in which the lock claws 26a of the lock plate 26 of the accessory holding unit 3 are inserted into the lock grooves 11b of the lock portion 11 of the video camera main-body 2 to be engaged, and the third fixing in which the lock pin 22 of the accessory holding unit 3 is fitted into the lock hole 11a of the lock portion 11 of the video camera main-body 2 to be locked. Further, in this mounting operation, the accessory holding unit 3 and the video camera main-body 2 can be electrically connected at the same time.

Therefore, in the imaging device according to the present disclosure, as described in the first embodiment, an accessory to which a large load is applied to the mounting portion can be easily mounted by the simple mounting operation, and the accessory is securely held in the mounted state, thereby achieving high safety and high reliability.

In addition, in the imaging device of the present disclosure, as illustrated in the configuration of the mounting/removing mechanism described in the first embodiment, when the accessory holding unit (3) with a load to be applied to the mounting portion is to be removed, the accessory holding unit (3) can be easily removed by performing substantially one removing operation of pinching the unlocking knobs (21) with one hand and pulling the accessory holding unit (3).

In the imaging device of the present disclosure, as described in the first embodiment, in the configuration of the mounting/removing mechanism, the accessory holding unit (3) cannot be removed from the imaging device main-body (2) without performing the operation of pulling the accessory holding unit (3) while simultaneously pressing at least two unlocking knobs (21) protruding from both sides. Therefore, a serious accident that the accessory holding unit (3) comes off the imaging device main-body (2) due to an unexpected impact or the like does not occur, and a highly-safety and highly-reliable imaging device can be obtained.

Furthermore, in the imaging device of the present disclosure, as described in the first embodiment, when the accessory component (9) with a load to be applied to the mounting portion being small is to be mounted to the imaging device main-body (2), the accessory component (9) can be mounted to the main-body side shoe (6) provided in the mounting/removing mechanism by a simple mounting operation (sliding operation). Therefore, the configuration of the mounting/removing mechanism in the imaging device of the present disclosure, appropriate mounting is enabled by a simple mounting operation in accordance with the function of an object to be mounted.

As described above, in the present disclosure, there is obtained a highly-safety and highly-reliable imaging device, in which mounting and removing of an accessory to and from the imaging device main-body is easy, and appropriate mounting and removing can be performed in accordance with a mounting/removing mechanism of the accessory.

INDUSTRIAL APPLICABILITY

In the imaging device of the present disclosure, an accessory with a load to be applied having a function of a handle can be easily mounted to and removed from the imaging device main-body, so that the imaging device is convenient to carry, to thereby obtain an imaging device with high production value.

The invention claimed is:
1. An imaging device, comprising:
an imaging device main-body; and
an accessory holding unit mountable to and removable from the imaging device main-body, wherein
the imaging device main-body includes a main-body side mounting/removing portion for mounting and removing the accessory holding unit, the main-body side mounting/removing portion includes a first engaged portion, a second engaged portion, a locked portion, and a first connection terminal having an electrical contact, the accessory holding unit includes a first engaging portion, a second engaging portion, a locking portion, and a second connection terminal, the main-body side mounting/removing portion includes a first mounting/removing movable portion which is disposed adjacent to the first engaged portion and is movable between a non-mounted position and a mounted position, and a second mounting/removing movable portion which is disposed adjacent to the second engaged portion, the locked portion, and the first connection terminal and is movable between a non-mounted position and a mounted position, when the accessory holding unit is mounted to the imaging device main-body, by pressing by the accessory holding unit, the first mounting/removing movable portion and the second mounting/removing movable portion are moved to the mounted positions, the first engaging portion and the first engaged portion are engaged with each other, the second engaged portion and the second engaging portion are engaged with each other, the locking portion and the locked portion are locked to each other, and the first connection terminal and the second connection terminal are electrically connected to each other, and when an accessory component is mounted only to the first engaged portion of the main-body side mounting/removing portion, by pressing by the accessory component, the first mounting/removing movable portion is moved to the mounted position to secure a mounting space for a mounting operation of the accessory component, and the second mounting/removing movable portion is held at the non-mounted position to protect the second engaged portion, the locked portion, and the first connection terminal.

2. The imaging device according to claim 1, wherein
when the second mounting/removing movable portion is pressed by the accessory holding unit and is moved to the mounted position, the first mounting/removing movable portion is moved to the mounted position in conjunction therewith, and when the first mounting/removing movable portion is pressed by the accessory component and is moved to the mounted position, the second mounting/removing movable portion is held at the non-mounted position.

3. The imaging device according to claim 1, wherein when the accessory holding unit is mounted to the imaging device main-body, by a pressing operation of the accessory holding unit, the first mounting/removing movable portion and the second mounting/removing movable portion are moved to the mounted positions, and by a sliding operation after the pressing operation, the first engaging portion and the first engaged portion are engaged with each other, the second engaged portion and the second engaging portion are engaged with each other, the locking portion and the locked portion are locked to each other, and the first connection terminal and the second connection terminal are electrically connected to each other.

4. The imaging device according to claim 1, wherein, in the first mounting/removing movable portion and the second mounting/removing movable portion at the non-mounted positions, surfaces to which the accessory holding unit is mounted are substantially flush.

5. The imaging device according to claim 3, wherein a plurality of grooves extending in a sliding direction of the sliding operation of the accessory holding unit are formed in a surface of the main-body side mounting/removing portion to which the accessory holding unit is mounted.

* * * * *